US010089474B2

(12) United States Patent
Roberts et al.

(10) Patent No.: US 10,089,474 B2
(45) Date of Patent: Oct. 2, 2018

(54) VIRTUAL MACHINE INTROSPECTION (71) Applicant: HEWLETT PACKARD ENTERPRISE DEVELOPMENT LP, Houston, TX (US)

(72) Inventors: Tony Roberts, Bristol (GB); Mike Wray, Bristol (GB); Nigel Edwards, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 103 days.

(21) Appl. No.: 15/021,032

(22) PCT Filed: Oct. 29, 2013

(86) PCT No.: PCT/US2013/067219
§ 371 (c)(1),
(2) Date: Mar. 10, 2016

(87) PCT Pub. No.: WO2015/065330
PCT Pub. Date: May 7, 2015

(65) Prior Publication Data
US 2016/0224794 A1    Aug. 4, 2016

(51) Int. Cl.
*G06F 21/57* (2013.01)
*G06F 21/56* (2013.01)
*G06F 21/62* (2013.01)
*G06F 9/455* (2018.01)

(52) U.S. Cl.
CPC ........ *G06F 21/577* (2013.01); *G06F 9/45558* (2013.01); *G06F 21/562* (2013.01); *G06F 21/566* (2013.01); *G06F 21/6218* (2013.01); *G06F 2009/45587* (2013.01)

(58) Field of Classification Search
CPC .. G06F 21/577; G06F 9/45558; G06F 21/562; G06F 21/566; G06F 21/6218
USPC ..................................... 726/22–25
See application file for complete search history.

(56) References Cited

U.S. PATENT DOCUMENTS

| 8,195,980 | B2 | 6/2012 | Schuba et al. |
| 2006/0136720 | A1 | 6/2006 | Armstrong et al. |
| 2008/0263658 | A1* | 10/2008 | Michael ............... G06F 21/562 |
| | | | 726/22 |

(Continued)

FOREIGN PATENT DOCUMENTS

| CN | 103077071 A | 5/2013 |
| WO | WO-2013/134206 A1 | 9/2013 |

OTHER PUBLICATIONS

Jonas Pfoh et al, A Formal Model for Virtual Machine Introspection, ACM, 2009.*

(Continued)

*Primary Examiner* — Shanto Abedin
(74) *Attorney, Agent, or Firm* — Hewlett Packard Enterprise Patent Department (57) ABSTRACT

Virtual machine introspection can include performing an offline analysis of a virtual machine hard disk image. Core operating system files associated with the operating system can be located during the offline analysis. Operating system structure symbols can be accessed from a symbol server based on the core operating system files. Introspection of the virtual machine can be performed using the accessed operating system structure symbols.

15 Claims, 3 Drawing Sheets

(56) References Cited

U.S. PATENT DOCUMENTS

| | | | |
|---|---|---|---|
| 2008/0320594 A1 | 12/2008 | Jiang | |
| 2012/0278295 A1 | 11/2012 | Hilldebrand et al. | |
| 2013/0247133 A1 | 9/2013 | Price et al. | |
| 2014/0189882 A1* | 7/2014 | Jung | G06F 9/45558 726/27 |
| 2014/0245444 A1* | 8/2014 | Lutas | G06F 12/109 726/24 |
| 2014/0372717 A1* | 12/2014 | Ciu | G06F 21/53 711/162 |
| 2014/0380474 A1* | 12/2014 | Paithane | G06F 21/566 726/23 |
| 2015/0013008 A1* | 1/2015 | Lukacs | G06F 21/53 726/24 |
| 2015/0033227 A1* | 1/2015 | Lin | G06F 21/55 718/1 |

OTHER PUBLICATIONS

Tal Garfinkel et al, A Virtual Machine Introspection Based Architecture for Intrusion Detection, NDSS Symposium (Year: 2003).*

Extended European Search Report, EP Application No. 13896266.7, dated May 3, 2017, pp. 1-11, EPO.

Nguyen Anh Ouynh, "Operating System Fingerprinting for Virtual Machines," Aug. 1, 2010, pp. 1-9.

Richard W.M. Jones and Matthew Booth, "Inspector—Display Operating System Version Other Information about a Virtual Machine," Jun. 6, 2012 [online], pp. 1-11, Retrieved from the Internet on Apr. 20, 2017 from URL: <http://libguestfs.org/virt-inspector.1.html>.

Tal Garfinkel and Mendel Rosenblum, "A Virtual Machine Introspection Based Architecture for Intrusion Detection" Proceedings of the Symposium on Network and Distributed System Security, Feb. 6, 2003, pp. 1-16.

Anthony Roberts et al., POSTER: Introducing Pathogen: A Real-Time Virtual Machine Introspection Framework, Nov. 2013, pp. 1-3, ACM.

Brendan Dolan-Gavitt et al., "Virtuoso: Narrowing the Semantic Gap in Virtual Machine Introspection," Apr. 15, 2011, pp. 1-16, Available at: <poly.edu/sites/polyproto.poly.edu/files/csaw2011 submission 35.pdf>.

International Search Report and Written Opinion, International Application No. PCT/US2013/067219, dated Jun. 26, 2014, pp. 1-7, KIPO.

Jonas Pfoh et al., "A Formal Model for Virtual Machine Introspection," 2009, pp, 1-9, ACM, Available at: <sec.in.tum.de/assets/staff/pfoh/PfohSchneider2009a.pdf>.

Sina Bahram et al., DKSM: Subverting Virtual Machine Introspection for Fun and Profit, Aug. 12, 2010, pp. 1-10, North Caroline State University, Available at: <www4.ncsu.edu/~mcgrace/SRDS10.pdf>.

Yangchun Fu and Zhiqiang Lin, "Space Traveling Across VM: Automatically Bridging the Semantic Gap in Virtual Machine Introspection via Online Kernel Data Redirection," Apr. 2012, pp. 586-600, IEEE.

Antonio Bianchi et al., "Blacksheep: Detecting Compromised Hosts in Homogeneous Crowds," ACM Conference on Computer and Communications Security, 2012, pp. 341-352, ACM.

Monirul Sharif et al., "Secure In—VM Monitoring Using Hardware Virtualization," 16th ACM Conference on Computer and Communications Security, Nov. 2009, pp. 477-487, ACM.

VMI Tools, "VMI Memory Analysis Framework," Sep. 18, 2013, pp. 1-2 (online), Retrieved from the Internet via archive.org on Apr. 25, 2018 at URL: <code.google.com/p/vmitools/>.

Volatile Systems, LLC, "The Volatility Framework: Volatile Memory Artifact Extraction Utility Framework," Oct. 26, 2013, pp. 1-2 (online), Retrieved from the Internet via archive.org on Apr. 25, 2018 at URL: <volatilesystems.com/default/volatility>.

* cited by examiner

VIRTUAL MACHINE INTROSPECTION

BACKGROUND

Virtualized machines can be used to host applications and services. However, malicious software (e.g., malware) can be installed on a virtual machine (VM) and used to disrupt operation of the VM, gather information stored on the VM, and/or gain access to a computing system. Malicious software has grown in complexity and rates of system infection. Left unguarded, a VM can be at risk against malicious software.

DETAILED DESCRIPTION

Malicious software can cause numerous issues with a VM. As a result, some methods have been devised to help prevent these issues from occurring. Some methods attempt to detect malicious software on the computing system, allowing for corrective measures to be taken. To detect the malicious software, some methods rely on installation of an in-system monitoring agent that can perform analysis of file and code execution within the system. However, these monitoring agents can themselves be at risk of malicious software attack, and many pieces of sophisticated malicious software attempt to identify and disable any detected security software upon infecting a system.

Some methods attempt to retain access to an operating system (OS) application programming interface (API) by installing an in-system monitoring agent, which is protected against malicious modifications. The in-system monitoring agent can then monitor the OS for attack by malicious software. However, while this approach aims to protect the in-system monitoring agent, it is still possible that a presence of the agent can be detected by malicious software and the malicious software can alter the agent's behavior, rendering the agent ineffective in detecting the malicious software.

Other methods attempt to detect malicious software by monitoring groups of similar systems and comparing memory snapshots taken from each to detect unknown, or unexpected system behavior that may be caused by the malicious software. However, this approach makes assumptions that systems are uninfected prior to taking the memory snapshots and performing its analysis. As such, if a number of systems are infected with malicious software before the memory snapshot and are then compared, the systems may appear to be uninfected by the malicious software.

In addition, some methods perform analysis of a system's memory through snapshots of the memory or through VM introspection. However, software associated with these methods must be manually updated in the event of an update to the OS associated with the system, which can leave the system vulnerable until the update can be performed.

Examples of the present disclosure can include performing an offline analysis of a VM hard disk image. Core OS files associated with the OS can be located during the offline analysis. OS structure symbols can be accessed from a symbol server based on the core operating system files. Introspection of the VM can be performed using the accessed OS structure symbols.

Figure 1:
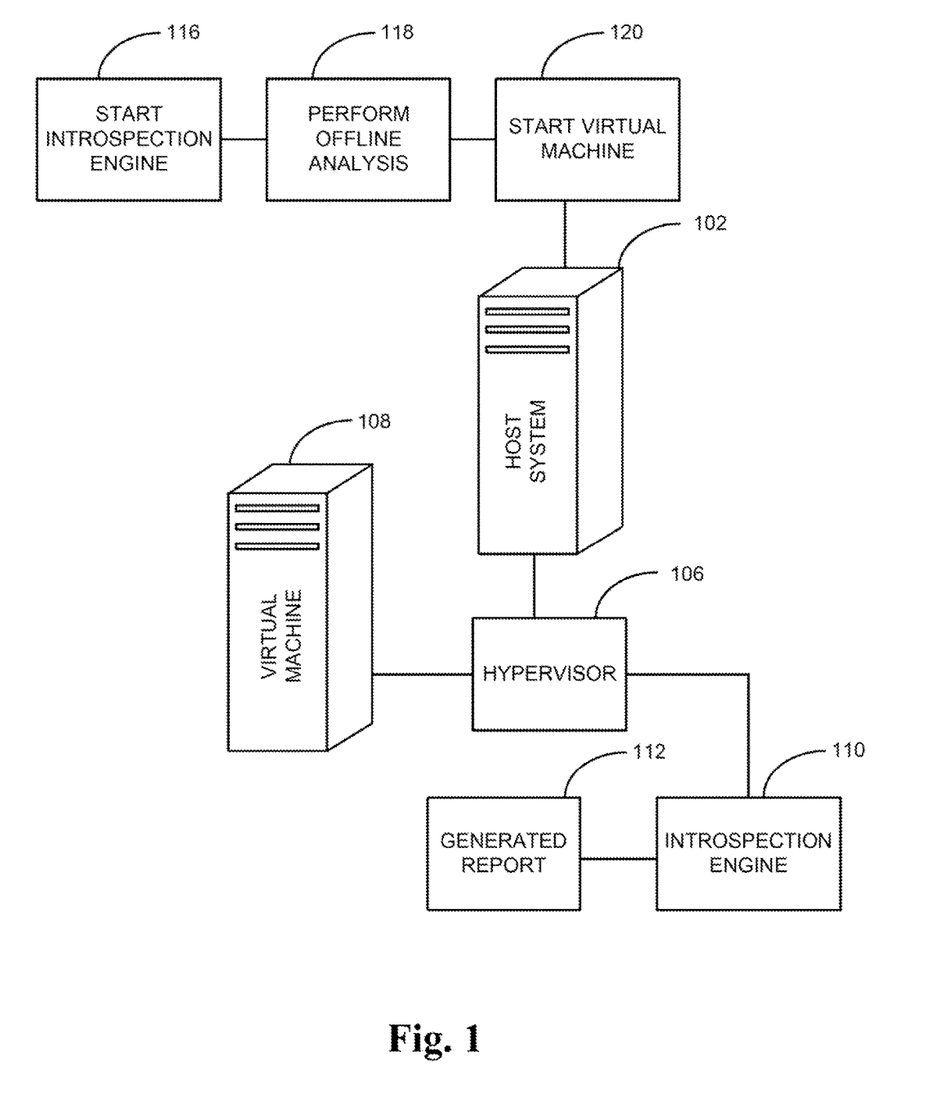
FIG. 1 illustrates an example of an environment for virtual machine introspection according to the present disclosure.

FIG. 1 illustrates an environment for performing VM machine introspection. The environment can include host system 102, hypervisor 106, VM 108, introspection engine 110, and generated report 112. In addition, the environment can include process steps perform offline disk analysis 118, start introspection engine 116, and start virtual machine 120. Examples of the present disclosure can detect malicious software on a VM 108 by performing an analysis that is external to the VM 108. By performing an analysis that is external to the VM 108, potential drawbacks associated with other methods can be avoided. For example, while some methods use an in-system monitoring agent, the agent can be compromised by malicious software, as discussed herein. By performing an analysis externally, malicious software may not have an opportunity to affect the analysis being performed. The analysis can be performed using introspection, which can be defined as an analysis that bypasses an OS of the VM, reading binary data directly from a hard disk associated with the VM.

Challenges can be associated with performing introspection because interpreting the memory of a virtual machine from outside of the virtual machine (e.g., bypassing the OS) can be difficult. For example, the memory associated with the virtual machine can include binary information, which can normally be interpreted by application programming interfaces associated with the OS. As such, when the application programming interface is bypassed, the binary information must be converted into meaningful information. Examples of the present disclosure can access a program database containing OS structure symbols, which can be used to interpret the binary data associated with a memory of the VM.

As a result of updates made to OSs, the OS structure symbols can be changed. As such, some methods that have attempted to use introspection can become out of date as a result of the updates. These methods may include manually updating a registry containing the OS symbol structures. However, as discussed herein, a VM 108 may be left vulnerable to malicious software attack at times before the manual updates are performed. Examples of the present disclosure can update the OS structure symbols when the program database containing the OS structure symbols is updated. As such, the virtual machine may not be left vulnerable to malicious software attack between periods of time in which manual updates are performed.

Examples of the present disclosure can include performing 118 an offline analysis of a VM hard disk image prior to starting the VM 108. In some examples, an introspection engine can be started 116 to perform the offline analysis 118. For example, the analysis of the VM 108 can be performed by the introspection engine 110 and can be performed in a disconnected state and prior to an initial startup of the VM 108. Once a VM 108 is in an online state (e.g., connected) it may be possible for malicious software to access the VM 108 and thus infect the VM 108. As such, by performing the analysis of the VM 108 offline, malicious software may not have an opportunity to access the VM 108.

In some examples, the offline analysis of the VM 108 hard disk image can include generating file offsets using the VM 108 hard disk image prior to starting the VM 108. In some examples, the file offsets can be determined from a file in an unaltered and/or unaccessed state because the analysis of the VM 108 hard disk image is being performed in a disconnected state and prior to the initial startup of the VM 108. As such, when the VM 108 is started up, the file offsets can be analyzed between the two states (e.g., prior to startup and after startup) to determine which files are being accessed, in some examples.

In some examples of the present disclosure, core OS files associated with the OS can be located when performing 118 offline analysis and prior to starting 120 the VM 108. In some examples, the OS version can be identified based on the offline analysis of the VM 108 hard disk image and the core OS files can be located based on the OS version.

The core OS files can include a kernel build version, an identifier associated with the OS, and/or a program database filename. The kernel build version can be used to identify the OS version. In an example of a Windows OS, the identifier associated with the OS can include a Globally Unique identifier.

Examples of the present disclosure can locate the program database filename and the identifier associated with the OS of the VM 108 during the offline analysis. By locating the program database filename and the identifier associated with the OS of the VM 108 during the offline analysis, malicious software may not have an effect on the location of the filename and identifier, which could cause an incorrect program database filename and/or identifier to be located. As discussed herein, in an example of a Windows OS, the identifier associated with the OS can include a Globally Unique Identifier, which can be used along with the program database filename to access the program database. The program database can contain debugging information for use in an event of a program and/or system crash. In addition, the program database can contain OS structure definitions, which can be used for performing introspection.

The OS structure definitions can include OS structure symbols, which can be used for interpreting the memory associated with the VM 108 and performing introspection. Examples of the present disclosure can access the program database containing OS structure symbols using the program database filename and the identifier associated with the OS of the VM 108 to access the OS structure symbols. Alternatively, the program database containing the OS structure symbols can be accessed based on the OS version to access the OS structure symbols.

In some examples, the program database can be used by the operating system to interface with the memory associated with the VM 108. For instance, the memory associated with the VM 108 can be in binary form. As such, the OS can read the memory associated with the VM 108 by using the OS structure definitions (e.g., OS structure symbols) included in the program database.

The program database can be located in a file system associated with the OS. For example, the program database can be stored in a memory utilized by the VM 108. Alternatively, the program database can be located in a symbol server remote from the VM 108. The symbol server can be contacted with the operating system version, the program database filename, and/or the identifier associated with the OS of the VM. Based on this information, the OS structure symbols can then be accessed on the symbol server and/or can be downloaded from the symbol server for use in performing introspection.

In an example, where the VM 108 utilizes a Windows OS, the program database (e.g., OS structure symbols) can be accessed, as follows. Depending on a configuration of the VM 108 being introspected, the Windows OS can use one of four specific kernels. For example, for a single processor system without a physical address extension (PAE), the file ntoskrnl.exe can be located to determine a build version so that a correct program database file can be accessed from Microsoft (e.g., symbol server). For a multiple processor system without a PAE, the file ntkrnlmp.exe can be located to determine the build version. For a single processor system with PAE, the file ntkrnlpa.exe can be located to determine the build version. For a multiple processor system with PAE, the file ntkrpamp.exe can be located to determine the build version.

In order to locate the correct kernel file within the VM's 108 virtual hard disk, the disk's master file table can be analyzed and the location of the kernel file can be determined, which can be performed before starting 120 the VM. The disk's master file table can be analyzed and the location of the kernel file can be determined as follows.

In some examples, all file records present within the master file table can be parsed looking for one that contains an attribute containing the particular kernel file (e.g., ntoskrnl.exe). Upon locating the records containing the particular attribute, a determination can be made whether the path to the kernel file is correct. When the correct file name and path are determined, the master file table can be parsed to locate a data attribute, which can store information on how the kernel file is physically stored on the disk (e.g., sectors, clusters). The data attribute can be analyzed and information can be accessed from the data attribute to locate all portions of the kernel file on the disk and create a copy of the file in memory, which can be sent to a Portable Executable (PE) analyzer.

In an example, due to the way the new technology file system (NTFS) is designed, files may not be stored in contiguous sectors. As such, examples of the present disclosure can reconstitute all portions of the kernel file into a single contiguous run of data. Microsoft Windows can use the PE format for executable files (e.g., .exe., .dll, etc.), for example. As such, a PE parser has been developed to analyze and extract information from within PE files associated with the OS. A specific area of a PE file related to the program database is known as a debug directory. The debug directory can contain information on a particular program database associated with the PE file. The program database is used by Microsoft's own debugger (e.g., WinDBG) so that internal structures (e.g., symbols) can be identified and used during debugging.

In some examples, information contained in the debug directory can consist of the program database filename (e.g., ntkrnlmp.pdb, which is required for ntoskrnl.exe) and the identifier associated with the OS, which can be referenced as a Globally Unique Identifier in Microsoft Windows. The program database file name and the identifier associated with the OS can be used to access the program database. For example, the program database can be accessed from the symbol server. Alternatively, as discussed herein, the program database can be accessed from the file system associated with the OS (e.g., in a Linux OS).

In some examples, after the program database has been accessed, the VM 108 can be started 120. The VM 108 can be hosted by a host system 102, in some examples. The host system 102 can be a physical server or a computer that has a hypervisor 106 running on it. The hypervisor 106 can be software that provides a virtualized environment in which software, including operating systems, can run with the appearance of full access to underlying system hardware, but in fact such access is under control of the hypervisor.

Examples of the present disclosure can include allocating a portion of a host system 102 memory associated with the VM 108 to perform introspection of the VM 108. In an example, during creation of the VM 108, the hypervisor 106 can allocate a region (e.g., single region) of memory associated with the host system 102 for use by the VM 108. As such, the memory region can be made available for performing introspection.

Examples of the present disclosure can include performing introspection of the VM 108 using the accessed OS structure symbols. In some examples, the present disclosure can detect whether malicious software is present in a memory of the VM 108 by performing introspection of the VM 108 using the accessed OS structure symbols. For example, a memory associated with the VM 108 can be interpreted using the OS structure symbols. As discussed herein, in-system monitoring agents can read the memory associated with the VM 108 using application programming interfaces associated with the OS. However, malicious software can alter a view that the in-system monitoring agent has because the malicious software can hide information and/or pass false information to the in-system monitoring agent through the application programming interface. For example, the malicious software can modify the application programming interface and/or manipulate kernel data structures.

During introspection of the VM 108, disk activity (e.g., reads, writes) associated with the VM can be monitored by using the OS structure symbols to interpret binary data included in input/output requests sent to/from the disk. For example, the kernel memory can be monitored using the OS structure symbols to interpret the binary data. By using the generated file offsets, as discussed herein, a determination can be made regarding which files the OS is currently accessing. As files are accessed by the OS, offsets associated with the files can be changed. As such, by comparing the generated file offsets generated before the VM 108 is started (e.g., file offsets as originally generated) to the monitored disk activity (e.g., file offsets after the VM 108 is started and files are accessed causing changes to the offsets), a determination can be made what files are currently being accessed. In addition, because the OS is being bypassed, installed malicious software may not cause accessed files to be hidden from view. Thus, a presence of the malicious software may not be concealed.

In some examples, the hypervisor 106 can intervene to handle certain events that occur within the VM 108 (e.g., page faults). Intervention with the hypervisor 106 can be triggered through a VM 108 control command. In an example of a Windows OS, the VM 108 control command can include a vmexit instruction that causes control of execution to pass to the hypervisor 106, which can perform operations and return control to the VM 108 with an associated vmenter instruction. The hypervisor 106 can handle the VM 108 control command with a control command handler. Examples of the present disclosure can include modifying the hypervisor 106 control command handler to detect a change to the memory of the VM 108 through the hypervisor 106 control command handler. For instance, the modified hypervisor 106 control command handler can access the memory associated with the VM 108 and allow the introspection engine 110 to analyze the memory associated with the VM 108.

In some examples, the binary data associated with the memory of the VM 108 can be accessed by modifying the hypervisor 106 control command handler executed by the hypervisor 106. As discussed herein, when memory of the VM 108 is accessed, the data can be in binary form, since the memory has not been interpreted by an application programming interface. The modified hypervisor 106 control command handler can access the binary data associated with the VM 108 memory when handling the VM 108 control commands. The data can then be passed to the introspection engine 110 by the hypervisor 106 and the accessed OS structure symbols can be used to interpret the binary data.

By interpreting the binary data, examples of the present disclosure can determine processes that are actively running on the VM 108 using introspection. As such, even if malicious software makes changes to the application programming interface in order to mask running processes associated with the malicious software, examples of the present disclosure can detect the malicious software because the application programming interface can be bypassed and raw binary data can be read through introspection. Examples of the present disclosure can therefore detect whether malicious software is present in the memory of the VM 108 by performing introspection of the VM 108 using the accessed OS structure symbols.

In some examples, management functions associated with a VM 108 control structure can be utilized to extract VM 108 central processing unit state information. The VM 108 control structure can be used to maintain transitions between VM 108 control commands (e.g., vmexit, vmenter). In an event of a VM 108 control command that causes control of execution to pass to the hypervisor 106 (e.g., vmexit) the host system 102 and the VM 108 central processing unit states can be recorded so that they can be restored upon a following VM 108 control command that returns control to the VM 108 (e.g., vmenter). Management functions associated with the VM 108 control structure present within the hypervisor can extract VM 108 central processing unit states state information. In an example, values of model specific registers can be extracted, which can store OS configuration data, such as kernel memory locations and flags to enable/disable hardware features.

In some examples, where introspection is performed with a Windows OS, introspection can begin with a location of a kernel processor control region (KPCR), a structure that can contain kernel specific data and pointers to additional control structures. Upon creation of the KPCR by the VM 108, the OS can store the physical address of the KPCR and the hypervisor can detect the creation of the KPCR through the modification made to the hypervisor 106 control command handler (e.g., hypervisor vmexit handler). Once the hypervisor 106 has detected the creation of the KPCR, a physical address of the KPCR can be passed to the introspection engine 110.

In response, the introspection engine 110 can locate OS page tables, which can be used for performing virtual-to-physical address translation. A base address of the OS page tables can be stored within a register of the central processing unit, and within a secondary kernel structure (e.g., kernel processor region control block (KPRCB)).

To determine correct offsets of elements within structures, the introspection engine can generate an in-memory hashmap of the KPCR, which can be generated by parsing OS structure symbols accessed from the program database and recording each element's offset, name, and type. To display a list of currently active processes, an OS kernel debugging structure (e.g., KDDEBUGGER_DATA64 (KDBG)) can be located. Upon location of the KDBG, an element of the KDBG can be parsed to locate an OS maintained doubly-linked list of active processes.

Each active process within the OS can be referenced through an EPROCESS structure, which can contain data relating to a current system activity associated with each active process, including a number of active threads, current memory utilization, and a unique numeric identifier. As each EPROCESS structure is within a doubly linked list, each contains a link to a next process in the list (e.g., flink) and a previous process in the list (e.g., blink). As such, each active process can be parsed by following each flink within the list. In addition, a currently executing thread can be monitored and by comparing what is currently executing with the data accessed from the EPROCESS linked list, potentially hidden processes (e.g., malicious software) can be identified.

Examples of the present disclosure can include receiving an update associated with the accessed OS structure symbols when the program database is updated. As a result of OS updates, OS structure symbols can change. For example, an OS update can update functionality of an OS and/or debug the OS. In the course of updating the OS, however, OS structure symbols can also be updated. When memory associated with the OS is accessed through an application programming interface, the updates can be applied and the memory can be correctly interpreted. However, if the application programming interface is bypassed when reading the memory associated with the VM 108, out of date OS structure symbols may be used to interpret the memory, which can cause an incorrect read of the memory.

As such, in some examples, the introspection engine 110 can have access to updated OS structure symbols. For instance, when the OS structure symbols are accessed from a server (e.g., Microsoft Public Symbol Server), the updated OS structure symbols can be accessed and/or downloaded from the server. In some examples, the introspection engine 110 can be notified that an update for the OS structure symbols is available and can automatically and/or manually (e.g., upon receiving a prompt) download and/or access the updated OS structure symbols. Alternatively, if the OS structure symbols are accessed from a file system associated with the OS, updated OS structure symbols can be downloaded and/or accessed from the file system when an update occurs.

In some examples, the OS structure symbols may be updated at regular time intervals on a server and/or a file system. As such, some examples of the present disclosure can check for updates at the regular time intervals. For instance, updates to the Microsoft Public Symbol Server can occur on Tuesdays and the introspection engine 110 can automatically access the Microsoft Public Symbol Server following the updates to access the updated OS structure symbols.

Examples of the present disclosure can include a generated report 112. The generated report 112 can include an analysis of the VM 108 performed by the introspection engine 110. As discussed herein, the analysis can detect whether malicious software is present in the memory of the VM 108 by performing introspection of the VM using the accessed OS structure symbols. The generated report can also include functionality for removing and/or quarantining the malicious software, in some examples and can be displayed on a graphical user interface.

Figure 2:
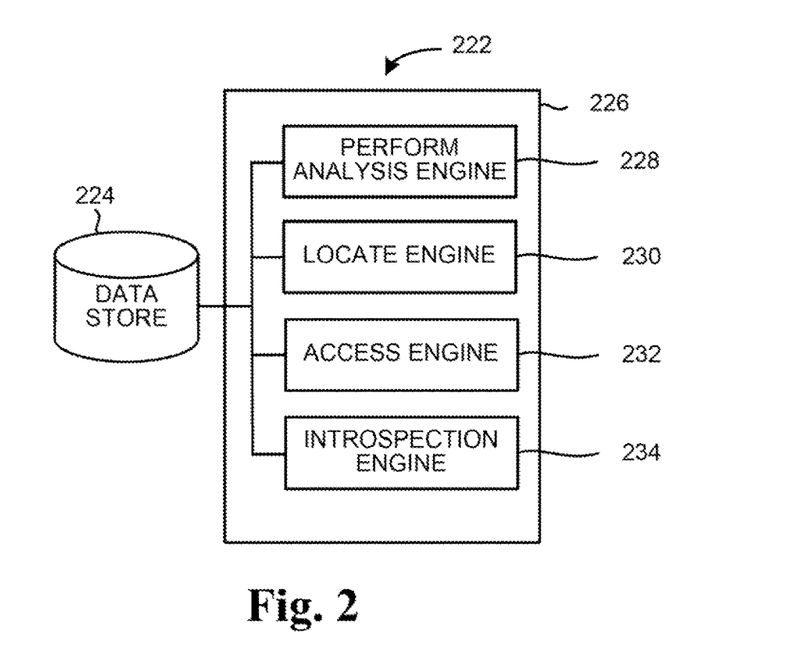
FIG. 2 illustrates a diagram of an example of a system for virtual machine introspection according to the present disclosure.

FIG. 2 illustrates a diagram of an example of a system 222 for virtual machine introspection according to the present disclosure. The system 222 can include a data store 224, an introspection system 226, and/or a number of engines. The system 222 can be in communication with the data store 224. In some examples, the introspection system 226 can include a number of engines (e.g., perform analysis engine 228, locate engine 230, access engine 232, introspection engine 234, etc.). The number of engines can include hardware and/or combinations of hardware and programming to perform functions provided herein. The introspection system 226 can include additional or fewer engines than illustrated to perform the various functions.

The perform analysis engine 228 can perform an offline analysis of the VM hard disk image prior to starting the VM. In some examples, an image of the hard disk can be captured and analyzed to generate file offsets prior to starting the VM. The offsets can be used to determine a file that the OS is accessing based on a comparison of the generated file offsets and monitored VM disk activity.

The locate engine 230 can locate a program database filename and an identifier associated with an OS of the VM during the offline analysis. The program database can be located on a server (e.g., external to the VM) in some examples. Alternatively, the program database can be located in a file system associated with the OS (e.g., internal to the VM).

The access engine can access the program database containing OS structure symbols using the program database filename and the identifier associated with the OS of the VM. Usually, an application programming interface associated with an OS can be used to read the binary data associated with a memory. However, when the application programming interface is bypassed, as during introspection, the data is in a binary form, which has to be interpreted. As such, examples of the present disclosure can access OS structure symbols stored in the program database, which can be used to interpret the binary data.

The introspection engine 234 can detect whether malicious software is present in a memory of the VM by performing introspection of the VM using the accessed OS structure symbols. In some examples, the memory associated with the VM can be read without use of an application programming interface. Thus, the memory can be read without the possibility of being affected by malicious software running undetected through alterations made to in-system monitoring agents and/or the application programming interface.

Figure 3:
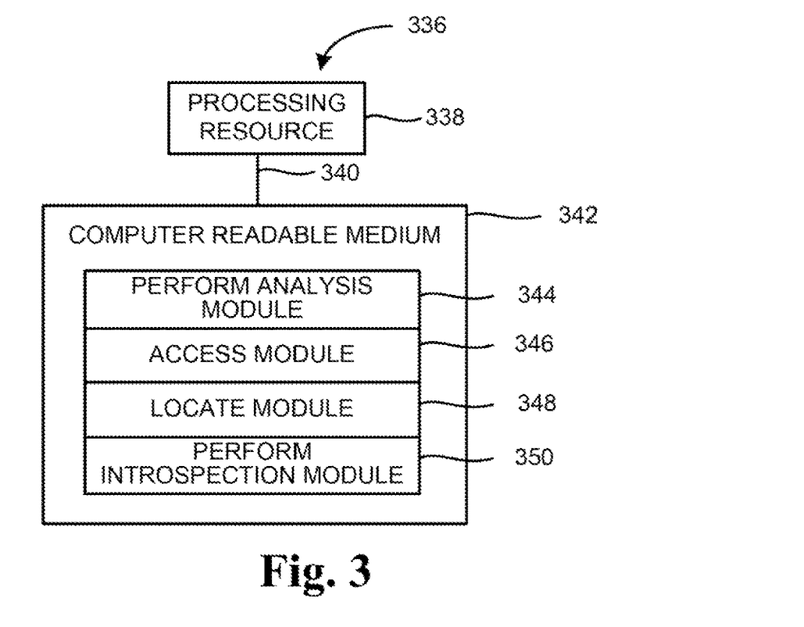
FIG. 3 illustrates a diagram of an example of a computing device for virtual machine introspection according to the present disclosure.

FIG. 3 illustrates a diagram of an example of a computing device 336 for providing resources to customers according to the present disclosure. The computing device 336 can utilize software, hardware, firmware, and/or logic to perform a number of functions described herein.

The computing device 336 can be a combination of hardware and instructions to share information. The hardware, for example can include a processing resource 338 and/or a memory resource 342 (e.g., computer-readable medium (CRM), database, etc.). A processing resource 338, as used herein, can include a number of processors capable of executing instructions stored by a memory resource 342. Processing resource 338 can be integrated in a single device or distributed across multiple devices. The instructions (e.g., computer-readable instructions (CRI)) can include instructions stored on the memory resource 342 and executable by the processing resource 338 to implement a particular function (e.g., virtual machine introspection, etc.).

The memory resource 342 can be in communication with the processing resource 338. A memory resource 342, as used herein, can include a number of memory components capable of storing instructions that can be executed by processing resource 338. Such a memory resource 342 can be a non-transitory CRM. The memory resource 342 can be integrated in a single device or distributed across multiple devices. Further, the memory resource 342 can be fully or partially integrated in the same device as the processing resource 338 or it can be separate but accessible to that device and the processing resource 338. Thus, it is noted that the computing device 336 can be implemented on a user device and/or a collection of user devices, on a mobile device and/or a collection of mobile devices, and/or on a combination of the user devices and the mobile devices.

The memory resource 342 can be in communication with the processing resource 338 via a communication link 340 (e.g., path). The communication link 340 can be local or remote to a computing device associated with the processing resource 338. Examples of a local communication link 340 can include an electronic bus internal to a computing device where the memory resource 342 is one of a volatile, non-volatile, fixed, and/or removable storage medium in communication with the processing resource 338 via the electronic bus.

The memory resource 342 can include a number of modules such as a perform analysis module 344, locate module 346, access module 348, and perform introspection module 350. The number of modules 344, 346, 348, 350 can include CRI that when executed by the processing resource 338 can perform a number of functions. The number of modules 344, 346, 348, 350 can be sub-modules of other modules. For example, the perform analysis module 344 and the perform analysis engine 228 can be sub-modules and/or contained within the same computing device. In another example, the number of modules 344, 346, 348, 350 can comprise individual modules at separate and distinct locations (e.g., CRM, etc.).

Each of the number of modules 344, 346, 348, 350 include instructions that when executed by the processing resource 338 can function as a corresponding engine as described herein. For example, the perform introspection module 350 can function as introspection engine 234, and the perform introspection module 350 can perform introspection of the VM using accessed OS structure symbols.

Figure 4:
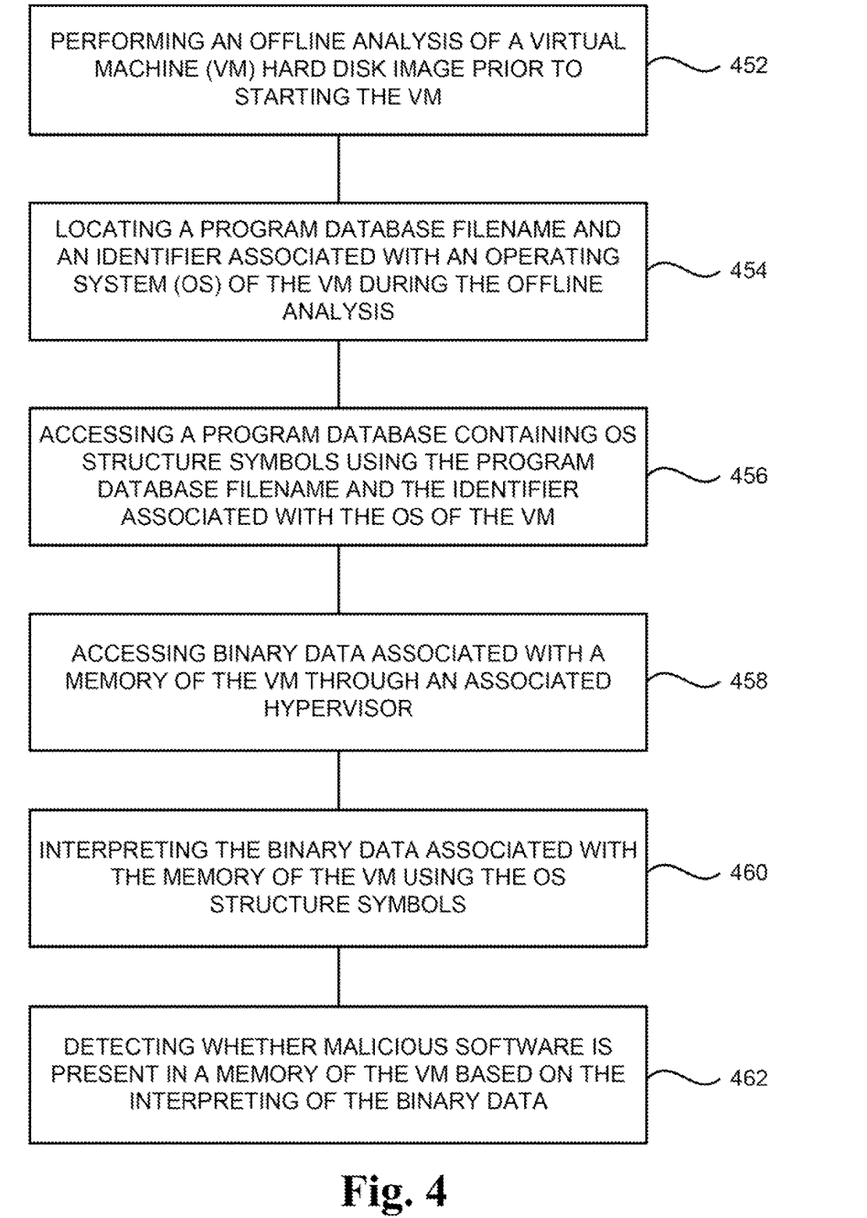
FIG. 4 illustrates a flow diagram of an example of a method for virtual machine introspection according to the present disclosure.

FIG. 4 illustrates a flow diagram of an example of a method for VM introspection according to the present disclosure. The method can include performing 452 an offline analysis of a VM hard disk image prior to starting the VM. As discussed herein, the analysis can be performed in a disconnected state and prior to an initial startup of the VM. Once a VM is in an online state it may be possible for malicious software to access the VM and thus infect the VM. As such, by performing the analysis of the VM offline, malicious software may not have an opportunity to access the VM 108. In addition, since the analysis of the VM hard disk image is performed prior to starting the VM, if any malicious software has infected the VM, the malicious software will not be running because the VM has not been started.

The method can include locating 454 a program database filename and an identifier associated with an OS of the VM during the offline analysis. In some examples, the program database can include OS structure symbols, which can be used to interpret a memory associated with the VM. As such, locating the program database filename and an identifier associated with the OS of the VM can ensure that a correct program database and thus correct OS structure symbols are identified.

The method can include accessing 456 a program database containing OS structure symbols using the program database filename and the identifier associated with the OS of the VM. In some examples, the OS structure symbols can be used to interpret binary data associated with a memory of the VM. As discussed herein, examples of the present disclosure can read the memory associated with the VM without using an application programming interface and/or an in-system monitoring agent. As such, even if malicious software affects the application programming interface and/or the in-system monitoring agent, an accuracy of a determination of malicious software may not be affected because the application programming interface and/or in-system monitoring agents are not used.

The method can include accessing 458 binary data associated with a memory of the VM through an associated hypervisor. In some examples, the hypervisor control command handler can be modified to detect a change to the memory of the VM through the hypervisor control command handler. The hypervisor control command handler can access the memory associated with the VM, allowing for access to the binary data, which can be read using the OS structure symbols. In some examples, the modified hypervisor control command handler can record a state associated with a central processing unit of the VM. The state associated with the central processing unit of the VM can be analyzed to determine processes that are being run by the VM and/or processes that are using memory associated with the VM.

The method can include interpreting 460 the binary data associated with the memory of the VM using the OS structure symbols. The OS structure symbols can be accessed from the program database and can be the same OS structure symbols used by the OS associated with the VM to read the memory. As such, the application programming interface may be bypassed when reading the memory of the VM.

The method can include detecting 462 whether malicious software is present in a memory of the VM based on the interpreting of the binary data. In some examples, by using the same OS structure symbols as the OS, the memory of the VM can be read as it would be by the OS. However, because introspection is performed external to the VM, malicious software may not interfere with reading of the memory, which may affect an accuracy of a determination of whether malicious software is present.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A non-transitory computer-readable medium storing instructions executable by a computer to cause the computer to:
    perform an offline analysis of a virtual machine (VM) hard disk image prior to starting the VM by bypassing an operating system (OS);
    locate core operating system (OS) files associated with the OS during the offline analysis;
    access OS structure symbols from a symbol server based on the core OS files;
    perform introspection of the VM using the accessed OS structure symbols, wherein introspection is performed by bypassing the OS, accessing binary data associated with a memory of the VM through a hypervisor, and interpreting the binary data using the OS structure symbols; and
    detect whether malicious software is present in the memory of the VM based on the introspection of the VM using the accessed OS structure symbols.

2. The medium of claim 1, including instructions executable to read the memory of the VM using the accessed OS structure symbols.

3. The medium of claim 1, including instructions executable to receive an update associated with the accessed OS structure symbols when the symbol server is updated.

4. The medium of claim 1, wherein the core OS files associated with the OS are located prior to starting the VM.

5. The medium of claim 1, including instructions executable to:
    modify a hypervisor control command handler; and
    detect a change to the memory of the VM through the hypervisor control command handler.

6. The medium of claim 1, including instructions executable to:
    identify an OS version during the offline analysis; and
    and locate core OS files associated with the OS based on the OS version.

7. The medium of claim 1, wherein the OS structure symbols are accessed from the symbol server based on the OS version.

8. The medium of claim 1, including instructions executable to utilize management functions associated with a VM control structure to extract VM central processing unit state information.

9. An introspection system comprising:
    a hardware processor; and
    a non-transitory computer readable medium storing instructions executable by the hardware processor to cause the hardware processor to:
        perform an offline analysis of a virtual machine (VM) hard disk image prior to starting the VM by bypassing an operating system (OS);
        locate a program database filename and an identifier associated with an operating system (OS) of the VM during the offline analysis;
        access, from a symbol server or from a file system associated with the OS, a program database containing OS structure symbols using the program database filename and the identifier associated with the OS of the VM;
        access binary data associated with a memory of the VM through a hypervisor; and
        detect whether malicious software is present in the memory of the VM by performing introspection of the VM using the accessed OS structure symbols, the introspection including interpreting the binary data using the accessed OS structure symbols.

10. The introspection system of claim 9, wherein the non-transitory computer readable medium stores instructions executable by the hardware processor to cause the hardware processor to allocate a portion of a host memory associated with the VM to perform the introspection of the VM.

11. The introspection system of claim 9, wherein the non-transitory computer readable medium stores instructions executable by the hardware processor to cause the hardware processor to:
    generate file offsets using the VM hard disk image prior to starting the VM;
    monitor VM disk activity; and
    determine a file that the OS is accessing based on a comparison of the generated file offsets and the monitored VM disk activity.

12. The introspection system of claim 11, wherein the program database is located in a file system associated with the OS.

13. A method for virtual machine (VM) introspection, comprising:
    performing, by a hardware based introspection system, an offline analysis of the VM hard disk image prior to starting the VM by bypassing an operating system (OS);
    locating, by the introspection system, a program database filename and an identifier associated with an operating system (OS) of the VM during the offline analysis;
    accessing, by the introspection system, a program database containing OS structure symbols using the program database filename and the identifier associated with the OS of the VM;
    accessing, by the introspection system, binary data associated with a memory of the VM through an associated hypervisor;
    interpreting, by the introspection system, the binary data associated with the memory of the VM using the OS structure symbols; and
    detecting, by the introspection system, whether malicious software is present in a memory of the VM based on the interpreting of the binary data.

14. The method of claim 13, wherein the method includes accessing the binary data associated with the memory of the VM by modifying a hypervisor control command handler.

15. The method of claim 14, wherein the modified hypervisor control command handler records a state associated with a central processing unit of the VM.

* * * * *